(12) United States Patent
Park

(10) Patent No.: US 10,992,529 B2
(45) Date of Patent: Apr. 27, 2021

(54) IN-VEHICLE ETHERNET COMMUNICATION SYSTEM AND COMMUNICATION METHOD THEREOF

(71) Applicants: Hyundai Motor Company, Seoul (KR); Kia Motors Corporation, Seoul (KR)

(72) Inventor: Soon Chul Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 16/118,951

(22) Filed: Aug. 31, 2018

(65) Prior Publication Data

US 2019/0182109 A1 Jun. 13, 2019

(30) Foreign Application Priority Data

Dec. 13, 2017 (KR) .......................... 10-2017-0171071

(51) Int. Cl.
| | | |
|---|---|---|
| *H04L 12/24* | (2006.01) | |
| *H04L 12/26* | (2006.01) | |
| *H04L 12/28* | (2006.01) | |
| *H04L 12/40* | (2006.01) | |

(52) U.S. Cl.
CPC .......... *H04L 41/083* (2013.01); *H04L 12/28* (2013.01); *H04L 12/40* (2013.01); *H04L 41/0886* (2013.01); *H04L 43/50* (2013.01)

(58) Field of Classification Search
None
See application file for complete search history.

(56) References Cited

U.S. PATENT DOCUMENTS

| | | | | |
|---|---|---|---|---|
| 2012/0063295 | A1* | 3/2012 | Bliss ...................... | H04L 1/0001 370/216 |
| 2015/0256383 | A1* | 9/2015 | Oh ........................ | H04L 41/0668 370/216 |
| 2017/0041161 | A1* | 2/2017 | Kaku ..................... | H04L 12/437 |
| 2017/0371819 | A1* | 12/2017 | Lin ........................ | G06F 13/364 |

FOREIGN PATENT DOCUMENTS

KR 100389922 B1 7/2003

\* cited by examiner

*Primary Examiner* — Saad Khawar
(74) *Attorney, Agent, or Firm* — Mintz Levin Cohn Ferris Glovsky and Popeo, P.C.; Peter F. Corless

(57) ABSTRACT

A first device, which is any one of a plurality of devices communicating with each other using an Ethernet scheme in the in-vehicle Ethernet communication system includes: a central processor, and a physical layer processor to connect the central processor to a second device which is another one of the plurality of devices, wherein the physical layer processor includes a counter to output a first counting end signal, a signal transmitter to demand that the first device continuously operate in response to receiving at least one of a mode signal and the first counting end signal, a signal receiver to output a master sensing signal, and an operation mode controller to determine an operation mode of the first device in response to receiving at least one of the first counting end signal and the master sensing signal and to generate the mode signal.

17 Claims, 8 Drawing Sheets

IN-VEHICLE ETHERNET COMMUNICATION SYSTEM AND COMMUNICATION METHOD THEREOF

CROSS-REFERENCE TO RELATED APPLICATION

This application claims the benefit of priority under 35 U.S.C. § 119 to Korean Patent Application No. 10-2017-0171071, filed in the Korean Intellectual Property Office on Dec. 13, 2017, the contents of which are hereby incorporated in their entirety by reference as if fully set forth herein.

BACKGROUND OF THE DISCLOSURE

Field of the Disclosure

Embodiments of the present disclosure relate generally to an in-vehicle Ethernet communication system and a communication method thereof and, more particularly, to an in-vehicle Ethernet communication system capable of supporting an auto-negotiation function satisfying requirements of an in-vehicle Ethernet and a communication method thereof.

Discussion of the Related Art

Generally, for a multimedia-related network requiring high-data transmission rate in a vehicle, a media oriented system transport (MOST) or low-voltage differential signal (LVDS) scheme has been used. To replace such a scheme, a commercial Ethernet scheme has recently been integrated in an in-vehicle communication system. Use of the commercial Ethernet scheme may increase speed and lower a system construction cost of the vehicle because low-cost components may be used. In addition, the commercial Ethernet scheme is advantageous in that the wiring and connection structure may be easily maintained by connecting an electronic controller unit (ECU) local network to one main system bus.

When the Ethernet scheme is used, the ECU may include a central processing unit (CPU) and a physical layer (PHY) processing device (e.g., a chip) for connecting the CPU to the exterior of the CPU. As is known by the term PHY, the PHY processing device is basically in charge of a PHY layer. That is, the PHY processing device serves to connect the ECU to the exterior of the ECU. More specifically, the PHY processing device receives an external signal, modifies the received external signal into a signal capable of being used in the CPU, decrypts and demodulates encrypted or modulated data into data of an original packet form, and supplies the decrypted and demodulated data to the CPU.

Currently, in-vehicle Ethernet technology, especially, standardization for the PHY layer, is being developed by international standardization organizations such as OPEN-SIG. Similarly, a software stack architecture for applying Ethernet to vehicles is in the process of being developed by vehicle manufacturers.

As an example, FIG. 1 is a block diagram of a general Ethernet communication system. The Ethernet communication system includes an Ethernet switch 10 and first and second devices 20 and 30.

Generally, an Ethernet auto-negotiation function refers to a function of an Ethernet PHY device for automatically configuring an optimal communication mode by exchanging capability information during initialization between the devices and 30 having mixed transmission schemes. When the communication system illustrated in FIG. 1 is equivalent to a conventional office Ethernet, the Ethernet auto-negotiation function is described as follows.

In this case, the first and second devices 20 and 30 may be personal computers (PCs) used in offices, for example. It is assumed, for the purposes of example, that the first device 20 has a speed supporting 100 Mbps, operates in a slave mode, and communicates with the Ethernet switch 10 by half duplex. Herein, half duplex enables bidirectional data transmission over a channel but does not allow simultaneous data transmission.

It is assumed, for the purposes of example, that the second device 30 also has a speed supporting 100 Mbps, operates in a master mode, and communicates with the Ethernet switch 10 by full duplex. Herein, full duplex enables simultaneous bidirectional data transmission over a channel. It is assumed that the Ethernet switch 10 has a speed supporting 10 Mbps to 100 Mbps, operates in any one of the slave mode and the master mode, and communicates with the first and second devices 20 and 30 by half duplex or full duplex.

In the above-described environment, each of the devices 10 to 30 connected during cable linkup transfers information about capabilities thereof to the other device and selects an optimal communication mode, thereby performing communication in the selected mode. However, since it takes about one second or more to perform the Ethernet auto-negotiation function, a time within 200 ms, which is needed for initialization of an in-vehicle Ethernet, cannot be satisfied. Thus, such a system cannot be applied to vehicles.

Alternatively, when the system illustrated in FIG. 1 is a conventional in-vehicle Ethernet, the Ethernet auto-negotiation function is described below. In this case, the first and second devices 20 and 30 may be ECUs mounted in the vehicle. It is assumed that the first device 20 has a support speed of 100 Mbps and operates in a slave mode. In addition, it is assumed that the second device 30 has a support speed of 100 Mbps and operates in a master mode. It is assumed that the Ethernet switch 10 has a support speed of 100 Mbps and operates in the master mode.

In the above-described environment, the system illustrated in FIG. 1 cannot perform the in-vehicle Ethernet auto-negotiation function because initialization needs to be completed within 200 ms. Communication is possible only when the Ethernet switch 10 and the first and second devices 20 and 30 support the same speed. Whether the devices 10 to 30 operate in the master mode or the slave mode is forcibly determined during development of these devices 10 to 30.

For example, when the second device 30 is designed during development to operate in the master mode and the Ethernet switch 10 is also designed during development to operate in the master mode, the Ethernet switch 10 and the second device 30 cannot communicate with each other. As a result, the conventional in-vehicle Ethernet system illustrated in FIG. 1 is subject to restrictions when performing plug-and-play which is traditionally an advantage of Ethernet.

SUMMARY OF THE DISCLOSURE

Accordingly, embodiments are directed to an in-vehicle Ethernet communication system and a communication method thereof that substantially obviate one or more problems due to limitations and disadvantages of the related art.

An object of embodiments is to provide an in-vehicle Ethernet communication system capable of supporting an auto-negotiation function satisfying requirements of an in-vehicle Ethernet and a communication method thereof.

According to embodiments of the present disclosure, a first device, which is any one of a plurality of devices communicating with each other using an Ethernet scheme in the in-vehicle Ethernet communication system may include: a central processor, and a physical layer processor configured to connect the central processor to a second device which is another one of the plurality of devices. The physical layer processor can include: a counter configured to output a first counting end signal after performing a counting operation during a first predetermined duration in response to receiving a driving power source, a signal transmitter configured to transmit a first master demanding signal for demanding that the first device continuously operate in a master mode in relation to the second device in response to receiving at least one of a mode signal and the first counting end signal, a signal receiver configured to output a master sensing signal which is transmitted by the second device and indicates whether a second master demanding signal for demanding that the second device continuously operate in the master mode is received, and an operation mode controller configured to determine an operation mode of the first device in response to receiving at least one of the first counting end signal and the master sensing signal and to generate the mode signal indicating the determined operation mode.

The operation mode controller may determine the operation mode of the first device in response to receiving the first counting end signal and an initial collision signal, and the signal receiver may determine whether the first master demanding signal and the second master demanding signal collide and output a result of the determination as the initial collision signal.

The counter may be reset in response to receiving the initial collision signal and output a second counting end signal after performing the counting operation during a second predetermined duration. The operation mode controller may generate the mode signal in response to receiving at least one of the second counting end signal, the master sensing signal, and a recollision signal. The signal receiver may determine whether the first master demanding signal and the second master demanding signal recollide and output a result of the determination as the recollision signal.

The in-vehicle Ethernet communication system may further include a duration determiner configured to determine at least one of the first predetermined duration and the second predetermined duration.

The physical layer processor may further include a master/slave signal generator configured to generate a master signal and a slave signal, and a signal selector configured to selectively output one of the master signal and the slave signal to the operation mode controller in response to the first or second counting end signal.

The signal selector may include a multiplexer configured to output the slave signal or the master signal in response to the first or second counting end signal.

operation mode controller may generate the mode signal so as to have a first level in response to the master signal output from the signal selector and generate the mode signal so as to have a second level in response to receiving the slave signal output from the signal selector.

The signal transmitter may transmit the first master demanding signal to the second device in response to the mode signal of the first level and transmit a first slave mode signal indicating that the first device operates in the slave mode to the second device in response to receiving the mode signal of the second level.

The signal transmitter may include a physical coding sublayer (PCS) transmitter configured to convert data received from the central processor into a first transmission symbol in response to receiving the mode signal, and a physical medium attachment (PMA) transmitter configured to convert the first transmission symbol received from the PCS transmitter into an electrical transmission signal.

The electrical transmission signal may include at least one of the first master demanding signal and the first slave mode signal.

The signal receiver may include a PMA receiver configured to convert an electrical reception signal received from the second device into a reception symbol, and a PCS receiver configured to decode the reception symbol and output the decoded symbol to the central processor. The electrical reception signal may include at least one of a second slave mode signal indicating that the second device operates in the slave mode and the second master demanding signal.

The physical layer processor may further include an information generator configured to transmit a first communication signal including first information about a first maximum supported communication speed of the first device to the second device in response to receiving the mode signal, an information receiver configured to receive a second communication signal including second information about a second maximum supported communication speed of the second device, and a communication speed determiner configured to determine a smaller speed between the first and second maximum supported communication speeds to be a communication speed of the first device. The physical layer processor may perform an initialization operation in response to receiving the determined communication speed.

The signal transmitter may transmit, to the second device, a first state check signal for determining a first signal transmission state to the second device from the first device in response to receiving the mode signal. The first state check signal may correspond to the first communication signal including the first information. A second state check signal for determining a second signal transmission state to the first device from the second device may correspond to the second communication signal including the second information.

The information generator may include an information adder configured to add the first information to the first state check signal.

The information adder may include a scrambler for scrambling the first information and the first state check signal and output the scrambled first information and first state check signal as the first state check signal to which the first information is added.

The scrambler may include a random number generator configured to generate a random number, a data selector configured to select scrambling data from the random number, and a scrambling unit configured to scramble the first state check signal and the first information. The signal transmitter may transmit the scrambled first state check signal and first information to the second device.

The information receiver may extract the second information from a signal generated by scrambling the second information and the second state check signal in the second device and transmitted from the second device.

Furthermore, in accordance with embodiments of the present disclosure, a communication method of performing communication by a first device which is any one of a plurality of devices communicating with each other using an Ethernet scheme in an in-vehicle Ethernet communication system can include: initializing a counting operation in a slave mode when a driving power source is applied to the first device, determining whether the counting operation is completed during a predetermined duration, when it is demanded that a second device which is another one of the plurality of devices, continuously operate in a master mode before the counting operation is completed during the predetermined duration, determining an operation mode of the first device to be the slave mode, and, when the operation mode of the first device is determined to be the slave mode, determining an operation mode of the second device to be the master mode.

The communication method may further include, when the counting operation is completed during the predetermined duration, demanding the second device that the first device continuously operate in the master mode, and when the second device does not demand the first device to continuously operate in the master mode, determining the operation mode of the first device to be the master mode. When the operation mode of the first device is determined to be the master mode, the operation mode of the second device is determined to be the slave mode.

If the second device demands that the second device continuously operate in the master mode when the first device demands that the first device continuously operate in the master mode, the communication method may further include resuming the counting operation.

The communication method may further include transmitting first information indicating a first maximum supported communication speed of the first device to the second device, receiving second information indicating a second maximum supported communication speed of the second device, comparing the first maximum supported communication speed with the second maximum supported communication speed using the first and second information and determining a smaller communication speed between the first and second maximum supported communication speeds to be a communication speed of the first device, and performing an initialization operation in the first device at the determined communication speed.

The communication method may further include transmitting, to the second device, a first state check signal for determining a first signal transmission state to the second device from the first device, and determining a second signal transmission state to the first device from the second device. When the first information is transmitted to the second device, the second signal transmission state may also be transmitted according to the checked result of the second signal transmission state.

The communication method may further include determining the first signal transmission state. The second information indicating the second maximum supported communication speed of the second device may be received according to the first signal transmission state.

The transmission of the first information indicating the first maximum supported communication speed of the first device to the second device may be performed after the confirmation of the operation mode of the first device.

BRIEF DESCRIPTION OF THE DRAWINGS

Arrangements and embodiments may be described in detail with reference to the following drawings in which like reference numerals refer to like elements and wherein.

Figure 1:
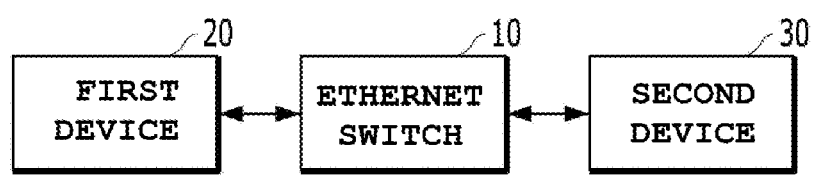
FIG. 1 is a block diagram of a general Ethernet communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

The present disclosure will now be described more fully hereinafter with reference to the accompanying drawings, in which various embodiments are shown.

The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

In describing the embodiments, when an element is referred to as being formed "on" or "under" another element, it can be directly "on" or "under" the other element or be indirectly formed with intervening elements therebetween.

When an element is referred to as being "on" or "under," "under the element" as well as "on the element" can be included based on the element.

In addition, as used herein, relational terms, such as "first", "second", "on"/"upper"/"above", "under"/"lower"/ "below," and the like, are used solely to distinguish one entity or element from another entity or element without necessarily requiring or implying any physical or logical relationship or order between such entities or elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, an in-vehicle Ethernet communication system (or an "in-vehicle Ethernet communication device") 100 according to embodiments of the present disclosure will be described with reference to the attached drawings.

Figure 2:
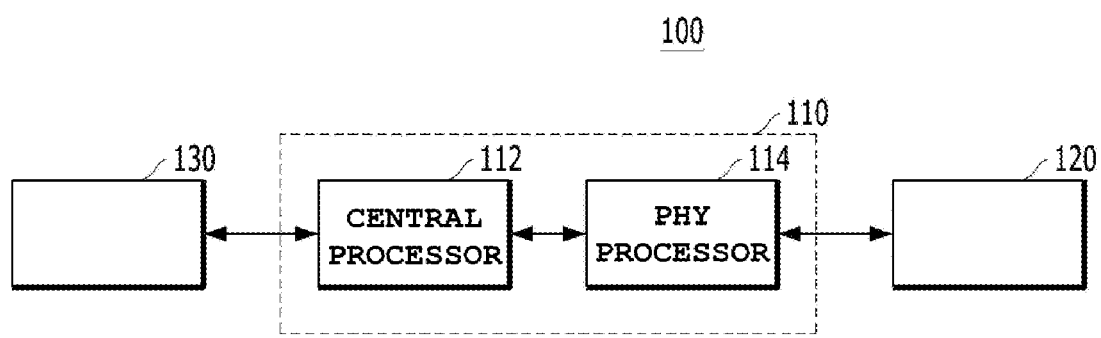
FIG. 2 is a schematic block diagram of an in-vehicle Ethernet communication system according to embodiments of the present disclosure.

FIG. 2 is a schematic block diagram of an in-vehicle Ethernet communication system 100 according to embodiments of the present disclosure.

The in-vehicle Ethernet communication system 100 shown in FIG. 2 may include a plurality of devices 110, 120, and 130 which communicate with each other using an Ethernet scheme. Although only the three devices 110, 120, and 130 are illustrated in FIG. 2, embodiments of the present disclosure are not limited thereto. That is, the number of devices included in the in-vehicle Ethernet communication system 100 may be 2 or more than 4.

Each of the plural devices 110, 120, and 130 may be an electric controller unit (ECU) installed in a vehicle or may be one of various devices located at the exterior of the vehicle which may communicate with the vehicle without being mounted in the vehicle, for example, a smartphone communicating with the vehicle by a Bluetooth function. Embodiments are not limited to the disposed locations of the devices 110, 120, and 130, specific constructions of the devices 110, 120, and 130, or specific functions performed by the devices 110, 120, and 130.

Hereinbelow, the construction and operation of any one (hereinafter referred to as a "first device") of the plural devices 110, 120, and 130 will be described. However, the construction and operation of another device (hereinafter referred to as a "second device") of the devices 110, 120, and 130 is the same as the construction and operation of the first device, respectively. For convenience of description, reference numeral 110 illustrated in FIG. 2 will be referred to as the first device and reference numeral 120 will be referred to as the second device.

The first device 110 may include a central processor 112 and a PHY processor (or a PHY processing device or a PHY chip) 114.

The central processor 112 of the first device 110 is a sort of CPU and cannot directly communicate with a central processor of the second device 120. Therefore, the PHY processor 114 of the first device 110 serves to connect the central processor 112 to the second device 120 (or cause the central processor 112 to communicate with the second device 120). That is, the PHY processor 114 of the first device 100 may receive a signal from the second device 120, modify the signal into a signal capable of being used in the central processor 112 of the first device 110, decrypt/de-modulate encrypted or modulated data back into data of an original packet form, and supply the decrypted or demodulated data to the central processor 112 of the first device 110.

Figure 3:
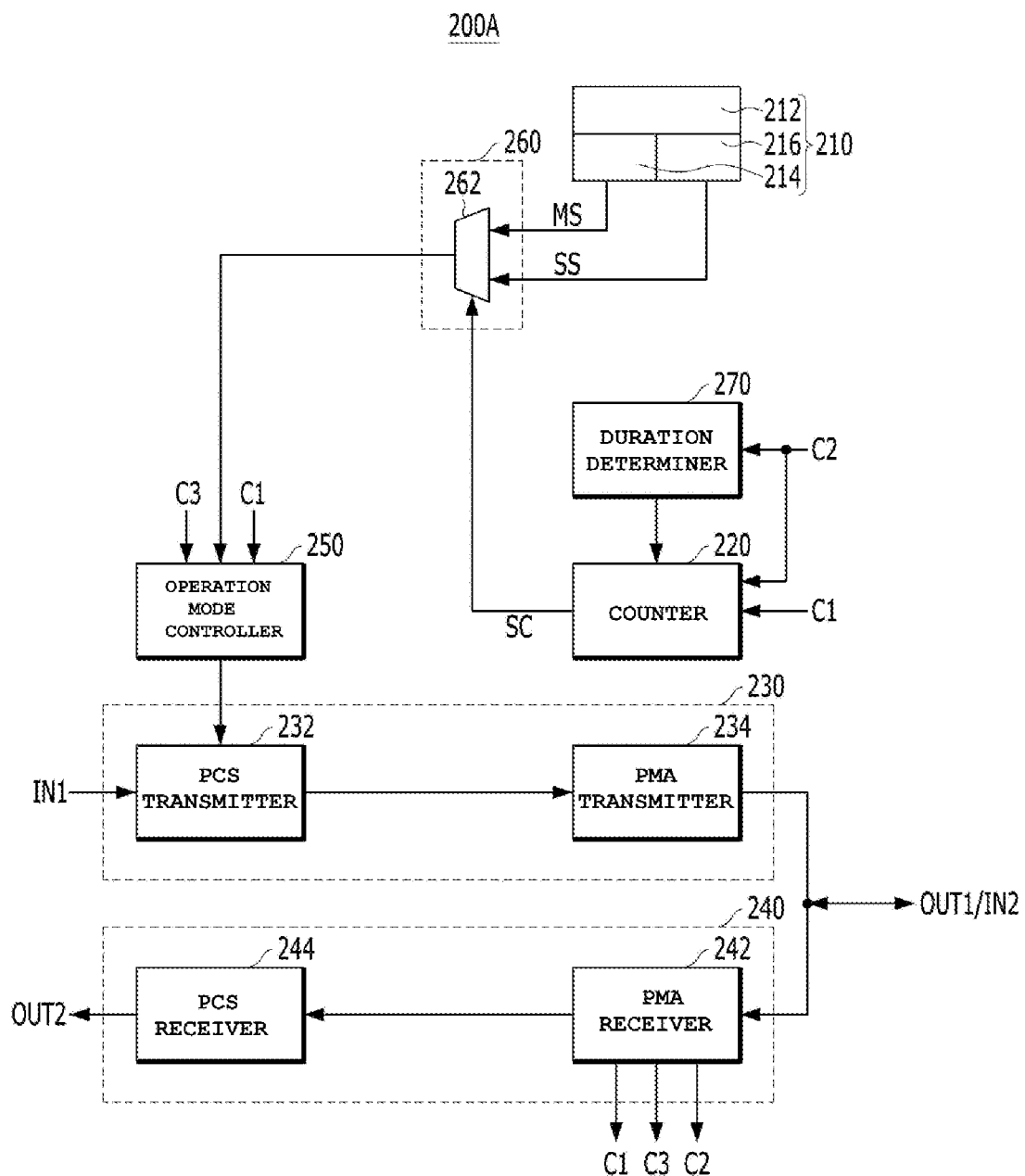
FIG. 3 is a block diagram of an example of a PHY processor illustrated in FIG. 2.

FIG. 3 is a block diagram of a PHY processor 200A which is an example of the PHY processor 114 illustrated in FIG. 2.

The PHY processor 200A of FIG. 3 may include a counter 220, a signal transmitter 230, a signal receiver 240, and an operation mode controller 250.

The counter 220 performs a counting operation during a first predetermined duration in response to receiving a driving power source, generates and outputs a first counting end signal upon completing the counting operation.

The operation mode controller 250 determines an operation mode of the first device 10 to be a master mode or a slave mode, in response to receiving at least one of the first counting end signal output from the counter 220 and a master sensing signal C1 output from the signal receiver 240, generates a mode signal indicating the determined operation mode, and transmits the generated mode signal to the signal transmitter 230.

For example, the operation mode controller 250 may control the operation mode of the first device 110 and control a transmission operation mode of the signal transmitter 230. The transmission operation mode may include, for example, a training mode, a send idle mode, a send idle/data mode, and a slave silent mode.

According to an embodiment, unlike FIG. 3, the operation mode controller 250 may directly receive the first counting end signal from the counter 220, directly receive the master sensing signal C1 from the signal receiver 240, and generate the mode signal using at least one of the directly received first counting end signal and master sensing signal C1.

According to another embodiment, as illustrated in FIG. 3, the operation mode controller 250 may also generate the mode signal using at least one of the first counting end signal and the master sensing signal C1 without directly receiving the first counting end signal from the counter 220 and the master sensing signal C1 from the signal receiver 242. To this end, the PHY processor 200A may further include a master/slave signal generator 210 and a signal selector 260.

The master/slave signal generator 210 functions to generate a master signal MS and a slave signal SS. To this end, the master/slave signal generator 210 may include a storage unit 212, a master signal generator 214, and a slave signal generator 216.

The storage unit 212 is a sort of register. The storage unit 212 may store data needed to generate the slave signal SS by the slave signal generator 216 and store data needed to generate the master signal MS by the master signal generator 214. That is, the storage unit 212 may be a PHY chip configuration storage memory. Herein, the PHY chip configuration storage memory represents a memory space, i.e., a register capable of being manipulated generally by a user in a semiconductor chip. In the above embodiment, the PHY chip configuration storage memory may be used through applications if a master/slave configuration region is present in a register of an existing PHY chip or may be newly generated if not.

The master signal generator 214 may generate the master signal MS using the data stored in the storage unit 212 and output the generated master signal MS to the signal selector 260.

The slave signal generator 216 may generate the slave signal SS using the data stored in the storage unit 212 and output the generated slave signal SS to the signal selector 260.

The signal selector 260 may selectively output one of the master signal MS and the slave signal SS output from the master/slave signal generator 210 to the operation mode controller 250 in response to receiving a first or second counting end signal SC. To this end, the signal selector 262 may include a multiplexer 262.

The multiplexer 262 may output one of the slave signal SS and the master signal MS to the operation mode controller 250 in response to receiving the first or second counting end signal SC output from the counter 220. For example, the multiplexer 262 may selectively output the slave signal SS in an initial state before the first or second counting end signal SC is output from the counter 220 and selectively output the master signal MS when the first or second counting end signal SC is output from the counter 220.

The signal transmitter 230 may transmit a first master demanding signal, for demanding that the first device 100 continuously operate in the master mode, to the second device 120 through an output terminal OUT1, in response to receiving at least one of the mode signal output from the operation mode controller 250 and the first counting end signal output from the counter 220.

For example, upon receiving the slave signal from the signal selector 260, the operation mode controller 250 controls the signal transmitter 230 using the mode signal so that the signal transmitter 230 may output, through the output terminal OUT1, a first slave mode signal indicating that the first device 110 operates in the slave mode. Alternatively, upon receiving the master signal MS from the signal selector 260, the operation mode controller 250 controls the signal transmitter 230 using the mode signal so that the signal transmitter 230 may output, through the output terminal OUT1, a first master demanding signal indicating that the first device 110 operates in the master mode or demanding that the first device 110 operate in the master mode.

For example, the operation mode controller 250 may generate the mode signal having a first level in response to receiving the master signal Ms output from the signal selector 260 and output the generated mode signal to the signal transmitter 230. Alternatively, the operation mode controller 250 may generate the mode signal having a second level in response to receiving the slave signal SS output from the signal selector 260 and output the generated mode signal to the signal transmitter 230.

In this case, the signal transmitter 230 may transmit the first master demanding signal to the second device 120 through the output terminal OUT1 in response to receiving the mode signal of the first level output from the operation mode controller 250. In addition, the signal transmitter 230 may transmit the first slave mode signal indicating that the first device 110 operates in the slave mode to the second device 120 through the output terminal OUT1 in response to receiving the mode signal of the second level output from the operation mode controller 250.

According to an embodiment, the signal transmitter 230 may include a physical coding sublayer (PCS) transmitter 232 and a physical medium attachment (PMA) transmitter 234.

The PCS transmitter 232 may convert data received through an input terminal IN1 from the central processor 112 into a first transmission symbol in response to receiving the mode signal received from the operation mode controller 250 and output the converted result to the PMA transmitter 234. For example, the PCS transmitter 232 may receive 3-bit transmission data from the central processor 112 through the input terminal IN1, convert the transmission data into two 3-level symbol, and output the converted result as the first transmission symbol.

The PMA transmitter 234 may convert the first transmission symbol received from the PCS transmitter 232 into an electrical transmission signal and output the converted electrical transmission signal to the second device 120 through the output terminal OUT1. The electrical transmission signal output from the PMA transmitter 234 may include at least one of the first master demanding signal MS and the first slave mode signal SS.

The signal receiver 240 may check whether a second master demanding signal transmitted from the second device 120 is received through the input terminal IN2 and output the checked result as the master sensing signal C1 to the counter 220. Herein, the second master demanding signal corresponds to a signal for indicating that the second device 120 operates in the master mode or for demanding that the second device 120 continuously operate in the master mode. The counter 220 may stop a counting operation in response to receiving the master sensing signal C1.

According to an embodiment, the signal receiver 240 may include a PMA receiver 242 and a PCS receiver 244.

The PMA receiver 242 may convert an electrical reception signal transmitted from the second device 120 and then received through an input terminal IN2 into a reception symbol and output the converted reception symbol to the PCS receiver 244. Herein, the electrical reception signal received by the PMA receiver 242 may include at least one of a second slave mode signal and the second master demanding signal. Here, the second slave mode signal may be a signal for indicating that the second device 120 operates in the slave mode.

The PCS receiver 244 may decode the reception symbol converted by the PMA receiver 242 and output bit data, which is the decoded result, to the central processor 112 through an output terminal OUT2.

The signal receiver 240 may check whether the first master demanding signal and the second master demanding signal collide and output the checked result as an initial collision signal C2. The operation mode controller 250 may determine the operation mode of the first device 110 in response to receiving the first counting end signal and the initial collision signal C2, generate and output the mode signal according to the determined operation mode.

According to an embodiment, unlike FIG. 3, the operation mode controller 250 may directly receive the initial collision signal C2 from the signal receiver 240 and generate the mode signal using the first counting end signal and the initial collision signal C2.

According to another embodiment, as illustrated in FIG. 3, the operation mode controller 250 may generate the mode signal using the first counting end signal and the initial collision signal C2 without directly receiving the initial collision signal C2 from the signal receiver 240. That is, the counter 220 is reset in response to receiving the initial collision signal C2 to resume counting. When a counting operation is completed during a second predetermined duration, the counter 220 may output a second counting end signal. When the first or second counting end signal is output while the signal selector 260 selectively outputs the slave signal SS to the operation mode controller 250, the signal selector 260 may selectively output the master signal MS to the operation mode controller 250.

According to an embodiment, the PHY processor 200A may further include a duration determiner 270. The duration determiner 270 may determine at least one of the first and second predetermined duration in response to receiving a driving power source or the initial collision signal C2 and output at least one of the determined first and second predetermined duration to the counter 220. For example, the duration determiner 270 may be a random number generator. The random number generator may generate a random number and convert the generated random number into the first or second predetermined duration to generate at least one of a first and second predetermined time. Herein, the first predetermined time corresponds to a timing at which the first device 110 first transmits the first master demanding signal to the second device 120 and the second predetermined time corresponds to a timing at which the first device 110 retransmits the first master demanding signal to the second device 120.

The operation mode controller 250 may generate the mode signal in response to receiving at least one of the second counting end signal, the master sensing signal C1, and the recollision signal C2 and output the generated mode signal to the signal transmitter 230. The signal receiver 240 may check whether the first master demanding signal and the second master demanding signal recollide and output the checked result to the duration determiner 270 and the counter 220 as the recollision signal C2. The counter 220 may resume a counting operation in response to receiving the recollision signal C2 and perform the counting operation during the second predetermined time.

Hereinafter, a method of determining an operation mode of each of the devices 110, 120, and 130 among communication methods performed by the in-vehicle Ethernet communication system according to an embodiment will be described with reference to the attached drawings. To aid in understanding the method of determining an operation mode according to an embodiment, although a communication method according to an embodiment is described as being performed by the above-described in-vehicle Ethernet communication system 100, embodiments of the present disclosure are not limited thereto. That is, according to another embodiment, the communication methods described below may be performed by a system having a construction different from that of the above-described in-vehicle Ethernet communication system.

Figure 4:
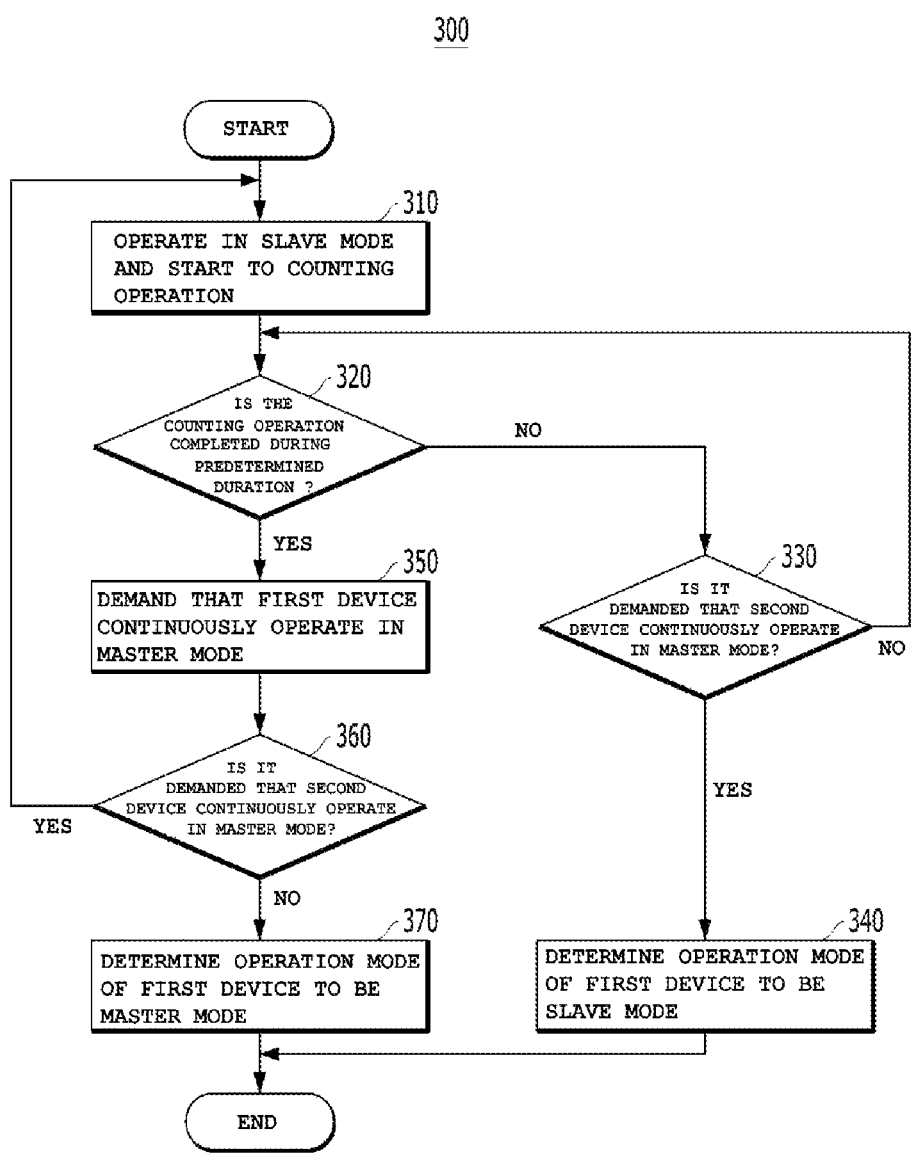
FIG. 4 is a flowchart illustrating a communication method according to embodiments of the present disclosure.
Figure 5:
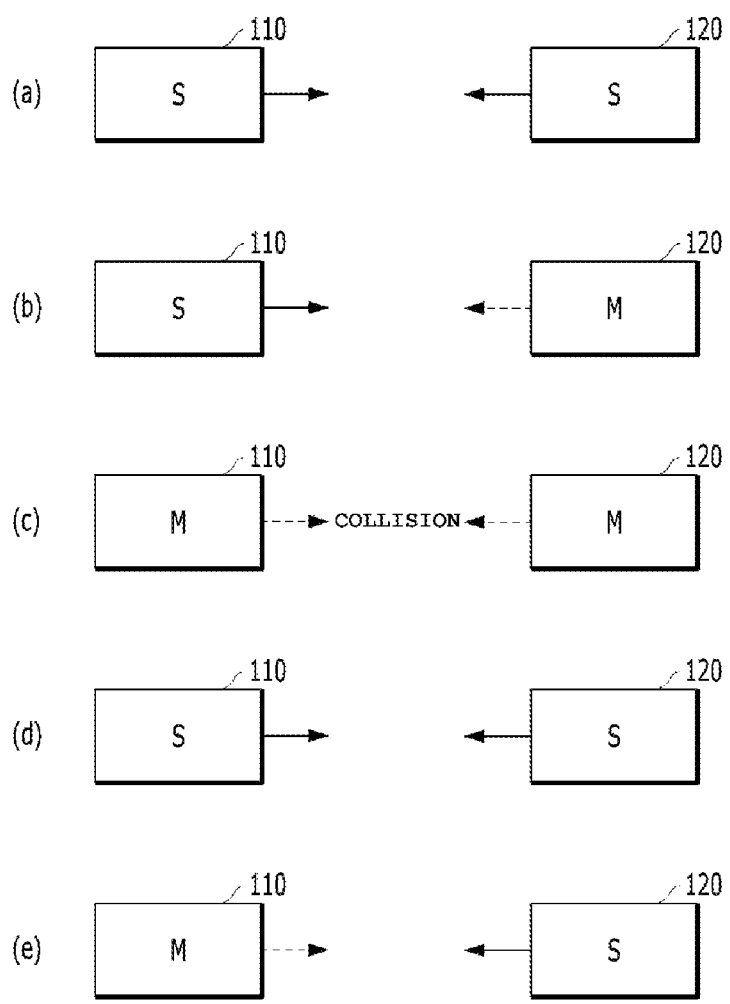
FIG. 5 illustrates operation modes of first and second devices in each step of the communication method illustrated in FIG. 4 and signal types transmitted between first and second devices.

FIG. 4 is a flowchart illustrating a communication method 300 according to embodiments of the present disclosure. FIG. 5 illustrates operation modes of the first and second devices 110 and 120 in each step of the communication method 300 illustrated in FIG. 4 and signal types transmitted between first and second devices 110 and 120. In FIG. 5, solid lines denote first and second slave mode signals and dotted lines denote first and second master demanding signals. In addition, in FIG. 5, "S" denoted in an inner side of each of the devices 110 and 120 represents that a corresponding device among the devices 110 and 120 operates in a slave mode and "M" denoted in the inner side of each of the devices 110 and 120 represents that the corresponding device among the devices 110 and 120 operates in a master mode.

The communication method 300 illustrated in FIG. 4 may be performed by the first device 110 or may be performed by each of the second and third devices 120 and 130.

Referring first to segment (a) of FIG. 5, when a driving power source needed to drive the first device 110 is applied to the first device 110 (or the PHY processor 114), the first device 110 operates in the slave mode and starts to perform a counting operation (step 310).

To perform step 310, when the driving power source is applied, the duration determiner 270 generates a random number, generates a first predetermined duration corresponding to the generated random number, and outputs the first predetermined duration to the counter 220. Next, the counter 220 starts to perform the counting operation. Before the counter 220 completes the counting operation during the first predetermined duration, the signal selector 260 selects a slave signal SS and outputs the slave signal SS to the operation mode controller 250. In this case, upon receiving the slave signal SS selected by the signal selector 260, the operation mode controller 250 controls the signal transmitter 230 using a mode signal so that the signal transmitter 230 may transmit a first slave mode signal.

While step 310 is performed, it is assumed that the second device 120 also operates in the slave mode.

After step 310, it is checked whether a counting operation is completed during the first predetermined duration (step 320). When the counting operation is completed during the first predetermined duration determined by the duration determiner 270, the counter 220 generates a first counting end signal, and outputs the first counting end signal to the signal selector 260. Upon receiving the first counting end signal, the signal selector 260 may selectively output a master signal MS and the operation mode controller 250 checks whether the master signal MS is outputted from the signal selector 260 to perform step 320.

If the counting operation is not completed during the first predetermined duration, it is checked whether it is demanded that the second device 120 continuously operate in the master mode (step 330). Or, it may be checked through the second master demanding signal whether the second device 120 operates in the master mode, in step 330. To perform step 330, the signal receiver 240 checks whether a second master demanding signal transmitted from the second device 120 is received through the input terminal IN2 and outputs the checked result as a master sensing signal C1. The operation mode controller 250 checks whether the master sensing signal C1 is generated while the signal selector 260 continues to selectively output the slave signal SS to check whether it is demanded that the second device 120 continuously operate in the master mode. Or, the operation mode controller 250 may checks whether the second device 120 operates in the master mode, by determining whether the master sensing signal C1 is generated while the signal selector 260 continues to selectively output the slave signal SS.

If it is demanded that the second device 120 continuously operate in the master mode before the counting operation is completed during the first predetermined duration, the operation mode of the first device 110 is determined to be the slave mode (step 340). Here, the operation mode of the first device 110 which operates in the slave mode may be confirmed as the slave mode in step 340.

Referring next to segment (b) of FIG. 5, the first device 110 operates in the slave mode until the counting operation is completed during the first predetermined duration. In this case, the second device 120 operating in the master mode after the operation mode the second device 120 has been changed into the master mode transmits the second master demanding signal demanding that the second device 120 continuously operate in the master mode to the first device 110. When the first device 110 receives the second master demanding signal, the counter 220 stops performing the counting operation by the master sensing signal C1 generated by the signal receiver 240. Then, the signal selector 260 maintains selection of the slave signal SS. The operation mode controller 250 determines the operation mode of the first device 110 to be the slave mode and outputs the determined result to the signal transmitter 230 as the mode signal.

As described above, when the operation mode of the first device 110 is determined to be the slave mode, the operation mode of the second device 120 may be determined to be the master mode. Here, the operation mode of the second device 120 operating in the master mode may be confirmed as the master mode, in step 340.

Meanwhile, when the counting operation is completed during the first predetermined duration, the operation mode of the first device 110 is changed from the slave mode to the master mode and the first device 110 demands the second device 120 that the first device 110 needs to continuously operate in the master mode (step 350). Step 350 is performed as follows in FIG. 3.

Upon completing the counting operation during the first predetermined duration, the counter 220 generates the first counting end signal SC and stops performing the counting operation. If the first counting end signal SC is output, the signal selector 260 selects the master signal MS and outputs the master signal MS to the operation mode controller 250. Upon receiving the master signal MS from the signal selector 260, the operation mode controller 250 controls the signal transmitter 230 using the mode signal so that the signal transmitter 230 may transmit the first master demanding signal to the second device 120.

After step 350, when the first device 110 demands the second device 120 that the first device 110 need to continuously operate in the master mode, the first device 110 checks whether the second device 120 also demands the first device 110 that the second device 120 needs to continuously operate in the master mode (step 360).

According to an embodiment, the signal receiver 240 may check whether the second master demanding signal is received through the input terminal IN2 while the first master demanding signal is transmitted to the second device 120 through the output terminal OUT1 and output the checked result to the counter 220 and duration determiner 270 as an initial collision signal C2.

According to another embodiment, the signal receiver 240 checks whether a signal received through the input terminal IN2 is distorted. If the signal is distorted, the signal receiver 240 may generate the initial collision signal C2.

As described above, when the initial collision signal C2 is generated, the duration determiner 270 may generate a new random number, convert the generated new random number into a second predetermined duration, and output the second predetermined duration to the counter 220. The counter 220 is reset in response to receiving the initial collision signal C2 and again performs the counting operation during the second predetermined duration. The signal selector 260 selects the slave signal SS and outputs the slave signal SS to the operation mode controller 250. Accordingly, the operation mode controller 250 checks whether the master signal MS selected by the signal selector 260 is changed to the slave signal SS to perform step 360.

When the first device 110 demands the second device 120 that the first device 110 need to continuously operate in the master mode, if the second device 120 also demands the first device 110 that the second device 120 needs to continuously operate in the master mode, the first device 110 proceeds to step 310 to resume the counting operation. Referring next to segment (c) of FIG. 5, when the first device 110 operating in the master mode transmits the first master demanding signal to the second device 120, if the second device 120 operating in the master mode transmits the second master demanding signal to the first device 110, collision occurs.

When collision occurs as illustrated in segment (c) of FIG. 5, referring now to segment (d) of FIG. 5, the first device 110 operating in the master mode changes the operation mode to the slave mode, generates the first slave mode signal, and transmits the first slave mode signal to the second device 120. In this case, the second device 120 operating in the master mode also changes the operation mode to the slave mode and transmits the second slave mode signal to the first device 110.

When the initial collision signal C2 is generated by the signal receiver 240, the duration determiner 270 determines the second predetermined duration and outputs the second predetermined duration to the counter 220. The counter 220 resumes the counting operation and performs the counting operation during the second predetermined duration. In this case, the signal selector 260 selects the slave signal SS. Upon receiving the slave signal SS, the operation mode controller 250 changes the operation mode of the first device 110 from the master mode into the slave mode and controls the signal transmitter 230 through the mode signal so that the signal transmitter 230 may output the first slave mode signal through the output terminal OUT1.

Next, steps 320, 330, 340, 350, and 360 are repeatedly performed. That is, the first device 110 checks whether the counting operation is completed during the second predetermined duration (step 320). The first device 110 checks whether it is demanded that the second device 120 continuously operate in the master mode before the counting operation is completed during the second predetermined duration (step 330). If it is demanded that the second device 120 continuously operate in the master mode before the counting operation is completed during the second predetermined duration, the first device 100 determines the operation mode thereof to be the slave mode (step 340). However, if the counting operation is completed during the second predetermined duration, the first device 110 changes the operation mode thereof into the master mode and demands the second device 120 that the first device 110 need to continuously operate in the master mode (step 350).

Next, if the counting operation is completed during the second predetermined duration and the first device 110 demands the second device 120 that the first device 110 need to continuously operate in the master mode, the first device 110 checks whether the second device 120 also demands the first device 110 that the second device 120 need to continuously operate in the master mode (step 360).

That is, if the counting operation is completed during the second predetermined duration, the counter 220 outputs the second counting end signal SC to the signal selector 260. Upon occurrence of the second counting end signal SC, the signal selector 260 selects the master signal MS and outputs the master signal MS to the operation mode controller 250. Upon inputting the master signal MS, the operation mode controller 250 changes the operation mode of the first device 110 into the master mode and controls the signal transmitter 230 through the mode signal so that the signal transmitter 230 transmits the first master demanding signal to the second device 120 (step 350). When the first master demanding signal is transmitted to the second device 120, if the second master demanding signal is input through the input terminal IN2, the signal receiver 240 recognizes that the first master demanding signal and second master demanding signal have re-collided, generates the recollision signal C2, and outputs the recollision signal C2 to the counter 220 and the duration determiner 270. If the recollision signal C2 occurs, the duration determiner 270 generates the second predetermined duration and outputs the second predetermined duration to the counter 220. The counter 220 resumes the counting operation and performs the counting operation during the second predetermined duration. Next, steps 310 to 360 are again repeatedly performed.

When the first device 110 demands the second device 120 that the first device 110 need to continuously operate in the master mode, if the second device 120 does not demand the first device 110 that the second device 120 need to continuously operate in the master mode, the operation mode of the first device 110 is determined as the master mode (step 370). Referring now to segment (e) of FIG. 5, while the first device 110 operating in the master mode transmits the first master demanding signal to the second device 120, if the second device 120 operating in the slave mode transmits the second slave mode signal to the first device 110 instead of the second master demanding signal, the operation mode of the first device 110 is determined as the master mode (step 370). That is, the operation mode of the first device 110 operating in the master mode is confirmed as the master mode, in step 370.

For example, each of the first and second master demanding signals may be an idle symbol (or an idle frame) and each of the first and second slave mode signals may be a zero symbol of 0 volt. If the operation mode of the first device 100 is confirmed to be the master mode as described above, the first device 100 transmits the idle symbol to the second device 120 so that the second device 120 receiving the idle symbol may confirm the operation mode thereof to be the slave mode.

That is, after the operation mode controller 250 controls the signal transmitter 230 through the mode signal so that the first master demanding signal is transmitted to the second device 120, if the signal selector 260 maintains selection of the master signal MS during a predetermined duration, it is determined that initial collision or recollision does not occur and the operation mode of the first device 110 may be confirmed to be the master mode. If the operation mode of the first device 110 is confirmed to be the master mode, the operation mode of the second device 120 is confirmed to be the slave mode.

Or, when the operation mode of the first device 110 is changed from the slave mode to the master mode, the first device 110 may inform the second device 120 through transmission of the idle symbol that the operation mode of the first device 110 is changed from the slave mode to the master mode and the first device 110 operates in the master mode. Then, if the second device 120 informed through the transmission of the idle symbol that the first device 110 operates in the master mode operates in the slave mode, the operation mode of the second device 120 is confirmed as the slave mode. However, if the second device 120 informed through the transmission of the idle symbol that the first device 110 operates in the master mode operates in the master mode, the operation mode of each of the first and second devices 110 and 120 is changed from the master mode into the slave mode.

Or, when the operation mode of the second device 120 is changed from the slave mode to the master mode, the second device 120 may inform the first device 110 through transmission of the idle symbol that the operation mode of the second device 120 is changed from the slave mode to the master mode and the second device 120 operates in the master mode. Then, if the first device 110 informed through the transmission of the idle symbol that the second device 120 operates in the master mode operates in the slave mode, the operation mode of the first device 110 is confirmed as the slave mode. However, if the first device 110 informed through the transmission of the idle symbol that the second device 120 operates in the master mode operates in the master mode, the operation mode of each of the first and second devices 110 and 120 is changed from the master mode into the slave mode.

As described above, the communication system and the communication method thereof according to an embodiment may automatically determine whether each of plural devices operates in the master mode or the slave mode. That is, according to the above-described in-vehicle Ethernet communication system and the communication method thereof, it may be confirmed that a device which has first transmitted the master demanding signal among a plurality of devices operates in the master mode and the other device operates in the slave mode. If the plural devices simultaneously transmit the master demanding signal so that collision between the master demanding signals occurs, it is confirmed that a device which has first transmitted the master demanding signal after a predetermined time (e.g., second predetermined duration) elapses operates in the master mode and the other device operates in the slave mode.

Meanwhile, another embodiment of the PHY processor 114 of the in-vehicle Ethernet communication system 100 according to an embodiment will be described hereinbelow.

Figure 6:
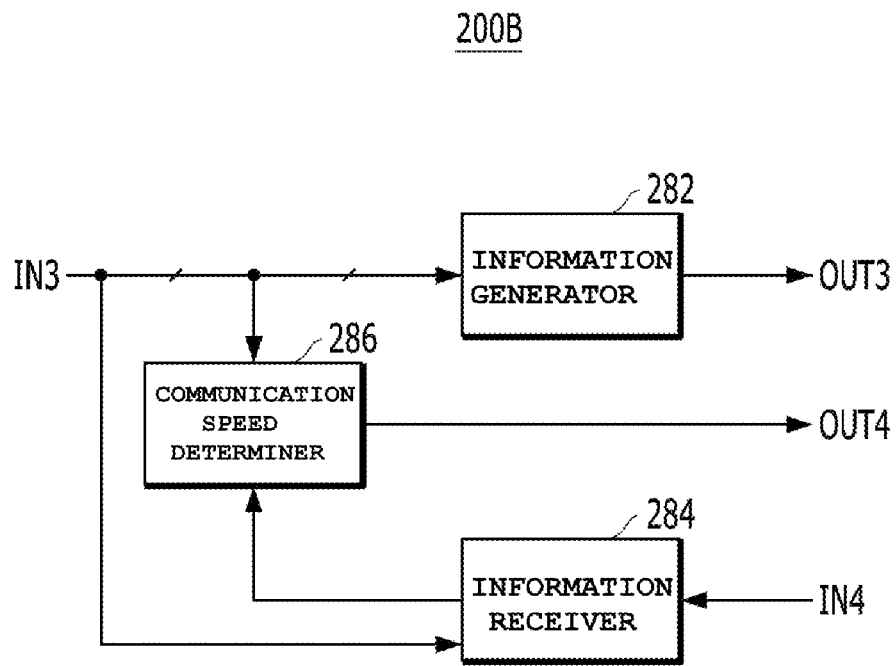
FIG. 6 is a block diagram of another example of a PHY processor illustrated in FIG. 2.

FIG. 6 is a block diagram of PHY processor 200B which is another example of the PHY processor 114 illustrated in FIG. 2.

The PHY processor 200B according to another embodiment may include the elements 210 to 270 of the PHY processor 200A illustrated in FIG. 3 and elements 282, 284, and 286 illustrated in FIG. 6. Except for the elements 282, 284, and 286 illustrated in FIG. 6, the PHY processor 200B according to the other embodiment is the same as the PHY processor 200A according to an embodiment. Therefore, a repetitive description of identical parts will be omitted and only different parts will be described.

The PHY processor 200B according to another embodiment may include the elements 210 to 270 illustrated in FIG. 3 and include an information generator 282, an information receiver 284, and a communication speed determiner 286 illustrated in FIG. 6.

The information generator 282 generates a first communication signal including first information about a first maximum supported communication speed of the first device 110 in response to receiving a mode signal received from the operation mode controller 250 through the input terminal IN3 and transmits the generated first communication signal to the second device 120 through the output terminal OUT3. In this case, the information generator 282 may perform an operation of generating the first communication signal when it is recognized that the operation mode of the first device 110 is confirmed through the mode signal provided through the input terminal IN3.

The above-mentioned first maximum supported communication speed refers to a maximum speed which may be supported by the first device 110 and the first device 110 may support all speeds up to the maximum speed or less.

The information generator 282 may receive the first information through the input terminal IN3. The first information may be provided from the central processor 112 to the information generator 282, but the embodiment is not limited to any specific position from which the first information is provided. The first communication signal generated from the information generator 282 may be transmitted to the second device 120 via the signal transmitter 230 through the output terminal OUT3.

Figure 7:
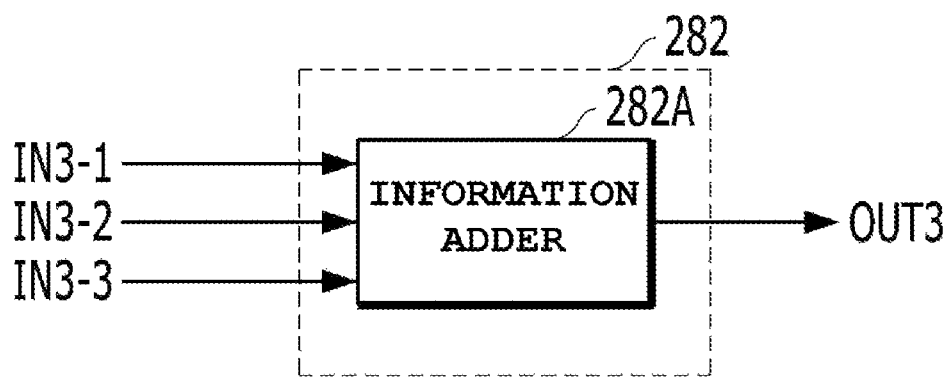
FIG. 7 is a block diagram an example of an information generator illustrated in FIG. 6.

FIG. 7 is a block diagram an example of the information generator 282 illustrated in FIG. 6.

The signal transmitter 230 may transmit a first state check signal to the second device 120 in response to receiving the mode signal. Herein, the first state check signal is a state check signal for determining a signal transmission state (hereinafter referred to as the "first signal transmission state") from the first device 110 to the second device 120. The first state check signal may correspond to the first communication signal including the first information. That is, the first device 110 may transmit the first state check signal including the first information to the second device 120. To this end, the information generator 282 may include an information adder 282A. The information adder 282A may add the first information received through an input terminal IN3-3 to the first state check signal received through an input terminal IN3-2, in response to receiving the mode signal received from the operation mode controller 250 through an input terminal IN3-1, and transmit the added result to the second device 120 via the signal transmitter 230 through the output terminal OUT3.

Figure 8:
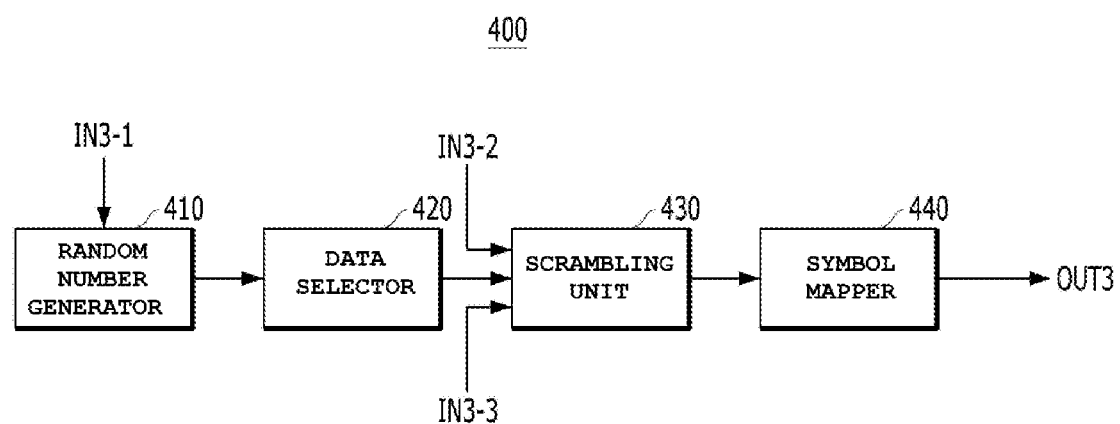
FIG. 8 is a block diagram of an example of an information adder illustrated in FIG. 7.

FIG. 8 is a block diagram of an example 400 of the information adder 282A illustrated in FIG. 7.

The information adder 282A may be implemented as a scrambler for scrambling the first information to the first state check signal and outputting the scrambled result as the first state check signal to which the first information is added. To this end, the scrambler 282A may be implemented as illustrated in FIG. 8.

The scrambler 400 of FIG. 8 may include a random number generator 410, a data selector 420, a scrambling unit 430, and a symbol mapper 440.

The information adder 282A or 400 illustrated in FIG. 7 or 8 may perform an operation of adding the first information to the first state signal when it is recognized that the operation mode of the first device 110 has been confirmed through the mode signal generated from the operation mode controller 250. For example, although the random number generator 410 operates in response to receiving the mode signal received through the input terminal IN3-1 as shown in FIG. 8, embodiments of the present disclosure are not limited thereto. That is, at least one of the random number generator 410, the data selector 420, the scrambling unit 430, and the symbol mapper 440 may start to perform an operation thereof in response to receiving the mode signal received through the input terminal IN3-1.

The random number generator 410 generates a random number and outputs the generated result to the data selector 420. For example, the random number generator 410 may be a pseudo-random number generator (PRNG) for generating 33-bit random data.

The data selector 420 selects scrambling data from the random number and outputs the selected scrambling data to the scrambling unit 430. For example, the data selector 420 may select 3-bit scrambling data (Syn[2:0]) using the 33-bit random number.

The scrambling unit 430 may scramble the first state check signal and the first information by the scrambling data and output the scrambled result to the symbol mapper 440. To this end, the scrambling unit 430 may receive the first information through the input terminal IN3-2 and receive the first state check signal through the input terminal IN3-3. However, embodiments of the present disclosure are not limited thereto.

The symbol mapper 440 may convert the result scrambled by the scrambling unit 430 into a second transmission symbol and transmit the converted result to the second device 120 via the PMA transmitter 234 of the signal transmitter 230 through the output terminal OUT3. For example, the symbol mapper 440 may map 3-bit transmission data scrambled by the scrambling unit 430 to two 3-level symbols (−1, 0, 1).

Alternatively, according to another embodiment, the scrambler 400 of FIG. 8 may exclude the symbol mapper 440. In this case, the result scrambled by the scrambling unit 430 may be output to the PCS transmitter 232 of the signal transmitter 230 and the PCS transmitter 232 may serve as the symbol mapper 440. That is, the result scrambled by the scrambling unit 430 may be converted into the second transmission symbol by the PCS transmitter 232 and may be transmitted to the second device 120 via the PMA transmitter 234.

Referring back to FIG. 6, the information receiver 284 receives, through an input terminal IN4, a second communication signal including second information about a second maximum supported communication speed of the second device 120. Herein, the second maximum supported communication speed refers to a maximum speed which may be supported by the second device 120 and the second device 120 may support all speeds up to the maximum speed or less.

In this case, the second state check signal may correspond to the second communication signal including the second information. That is, in a similar way to the case in which the first device 110 scrambles the first information to the first state check signal and transmits the scrambled result to the second device 120, the second device 120 may also scramble the second information to the second state check signal and transmit the scrambled result to the first device 110. Herein, the second state check signal is a state check signal for determining a signal transmission state (hereinafter referred to as the "second signal transmission state") from the second device 120 to the first device 110. In this case, the information receiver 284 may extract the second information from the signal obtained by scrambling the second information to the second state check signal by the second device 120 and output the extracted result to the communication speed determiner 286.

According to an embodiment, each of the first and second state check signals may be an idle frame (or idle symbol).

The communication speed determiner 286 may determine the smaller of the first maximum supported communication speed received through the input terminal IN3 and the second maximum supported communication speed received through the information receiver 284 to be a communication speed of the first device 110 and output the determined speed to each element of the first device 110 through the output terminal OUT4. If the first maximum supported communication speed received through the input terminal IN3 and the second maximum supported communication speed received from the information receiver 284 are equal, the communication speed determiner 286 may determine the first or second maximum supported communication speed to be the communication speed of the first device 110 and output the determined speed to each element of the first device 110 through the output terminal OUT4. Accordingly, the PHY processor 114 of the first device 110 may perform an initialization operation in response to receiving the determined communication speed.

Hereinafter, a communication speed optimization auto-configuration method among communication methods performed by the in-vehicle Ethernet communication system according to an embodiment will be described with reference to the attached drawings. Although the communication speed optimization auto-configuration method according to an embodiment is described as being performed by the above-described in-vehicle Ethernet communication system to aid in understanding of the method according to an embodiment, embodiments of the present disclosure are not limited thereto. That is, according to another embodiment, the communication method described below may also be performed by a system having a construction different from that of the above-described in-vehicle Ethernet communication system.

Figure 9:
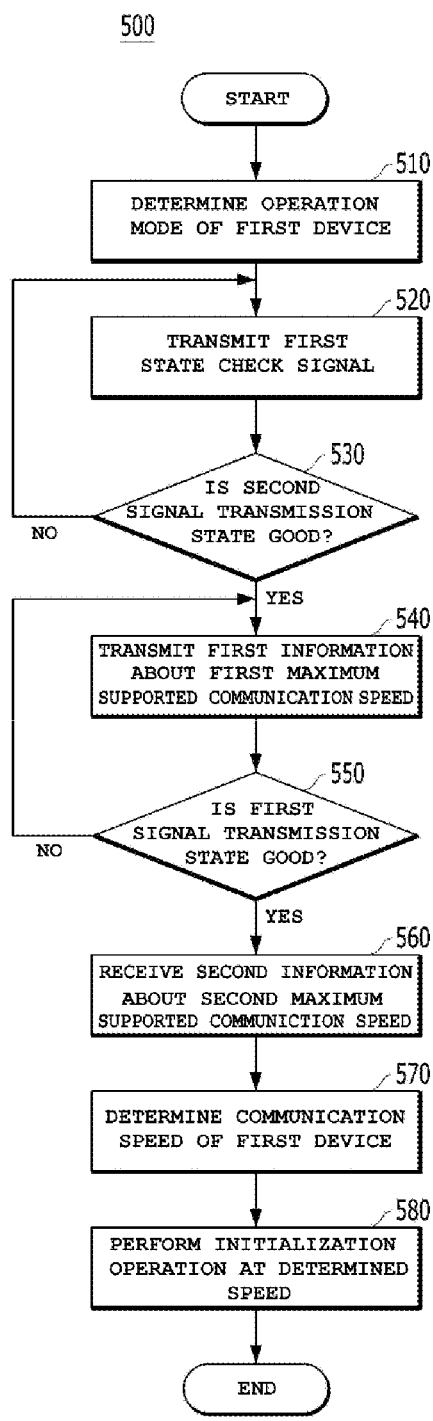
FIG. 9 is a flowchart illustrating a communication speed optimization auto-configuration method among communication methods according to embodiments of the present disclosure.
Figure 10:
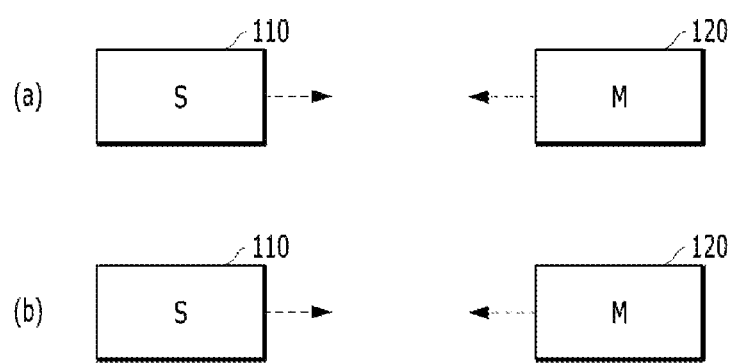
FIG. 10 illustrates operation modes of first and second devices in each step of the communication method illustrated in FIG. 9 and signal types transmitted between first and second devices.

FIG. 9 is a flowchart illustrating a communication speed optimization auto-configuration method 500 among communication methods according to embodiments of the present disclosure. FIG. 10 illustrates operation modes of first and second devices in each step of the communication method 500 illustrated in FIG. 9 and signal types transmitted between first and second devices 110 and 120. In FIG. 10, dotted lines denote first and second master demanding signals. Herein, the first master demanding signal may be a signal to which the first information is added or a signal to which the first information is not added. Similarly, the second master demanding signal may be a signal to which the second information is added or a signal to which the second information is not added. In FIG. 10, "S" denoted in an inner side of each of the devices 110 and 120 represents that a corresponding device operates in a slave mode and "M" denoted in the inner side of each of the devices 110 and 120 represents that the corresponding device operates in a master mode.

Referring now to FIG. 9, in the communication speed optimization auto-configuration method 500 according to embodiments of the present disclosure, the operation mode of the first device 110 is first determined (that is, confirmed) (step 510). Step 510 may be determined as illustrated in FIG. 4. However, according to another embodiment, step 510 may be omitted. In the method of FIG. 4 for performing step 510, a repeated description will be omitted.

In segment (a) of FIG. 10, although the operation mode of the first device 110 is determined to be the slave mode and the operation of the second device 120 is determined to be the master mode in step 510, embodiments of the present disclosure are not limited thereto. That is, even when the operation mode of the first device 110 is determined to be the master mode and the operation mode of the second device 120 is determined to be the slave mode in step 510, the method illustrated in FIG. 9 may be performed.

After step 510, the first device 110 transmits, to the second device 120, a first state check signal for determining a first signal transmission state from the first device 110 to the second device 120 (step 520). Referring now to segment (a) of FIG. 10, the first device 110 operating in the slave mode transmits the first state check signal to the second device 120. In this case, the second device 120 operating in the master mode may transmit to the first device 110 a second state check signal for determining a second signal transmission state from the second device 120 to the first device 110.

If it is recognized that the operation mode of the first device 110 is confirmed, the operation mode controller 250 controls the signal transmitter 230 through a mode signal to transmit the first state check signal to the second device 120. If each of the first and second state check signals is an idle symbol, a transmission operation mode determined by the operation mode controller 250 may be a training mode for transmitting the idle symbol to the second device 120 as the first state check signal.

After step 520, the first device 110 checks the second signal transmission state (step 530). For example, the signal receiver 240 may receive the second state check signal transmitted by the second device 120, check the second signal transmission state using the received second state check signal, and output the checked result to the operation mode controller 520 as a state signal C3.

If it is checked that the second signal transmission state is good, the first device 110 transmits first information about a first maximum supported communication speed of the first device 110 to the second device 120 together with the checked second signal transmission state (step 540). Referring to segment (b) of FIG. 10, the first device 110 operating in the slave mode may transmit the first information and the second signal transmission state in addition to the first state check signal to the second device 120. The transmission operation mode of step 540 may be a send idle mode for transmitting the second signal transmission state and the first state check signal including the first information to the second device 120 in the form of an idle frame.

To perform step 540, when it is recognized that the second signal transmission state is good through the state signal C3 received from the signal receiver 240, the operation mode controller 250 may control the information generator 282 using the mode signal to transmit a first communication signal having the first information about the first maximum supported communication speed of the first device 110 to the second device 120. Alternatively, the information generator 282 may transmit the first information added to the first state check signal to the second device 120 by control of the mode signal. As described with reference to FIG. 8, the first information may be scrambled to the first state check signal and then may be transmitted.

For example, the scrambling unit 430 may scramble the first maximum supported communication speed corresponding to the first information and the second signal transmission state as follows. $Sd_n[2]$ may indicate the second signal transmission state as $Sy_n[2]$ wherein n denotes an index.

When the first maximum supported communication speed is 100 Mbps, scrambling such as $Sd_n[1]=Sy_n[1]$ XOR '0' and $Sd_n[0]=Sy_n[0]$ XOR '0' may be performed. Alternatively, when the first maximum supported communication speed is 1 Gbps, scrambling such as $Sd_n[1]=Sy_n[1]$ XOR '0' and $Sd_n[0]=Sy_n[0]$ XOR '1' may be performed. Alternatively, when the first maximum supported communication speed is 10 Gbps, scrambling such as $Sd_n[1]=Sy_n[1]$ XOR '1' and $Sd_n[0]=Sy_n[0]$ XOR '0' may be performed. Alternatively, when the first maximum supported communication speed is reserved, scrambling such as $Sd_n[1]=Sy_n[1]$ XOR '1' and $Sd_n[0]=Sy_n[0]$ XOR '1' may be performed.

After step 540, it is checked whether the first signal transmission state is good (step 550). Like the case in which the second signal transmission state checked by the first device 110 is transmitted to the second device 120, the first signal transmission state checked by the second device 120 is received from the second device 120 to check whether the first signal transmission state is good. For example, the signal receiver 240 may check whether the first signal transmission state is good using information about the first signal transmission state added to the second state check signal transmitted by the second device 120.

If the first signal transmission state is good, the first device 110 receives second information about second maximum supported communication speed of the second device 120 (step 560). To this end, the signal receiver 240 checks whether the first signal transmission state is good using the information about the first signal transmission state added to the second state check signal transmitted by the second device 120 and outputs the checked result to the information receiver 284. Upon recognizing that the first signal transmission state is good through the checked result received from the signal receiver 240 through the input terminal IN3, the information receiver 284 may receive a second communication signal having the second information through the input terminal IN4.

After step 560, the first device 110 compares the first maximum supported communication speed with the second maximum supported communication speed using the first and second information, and determines the smaller of the first and second maximum supported communication speeds to be the communication speed of the first device 110 (step 570). If the first and second maximum supported communication speeds are equal, the first or second maximum supported communication speed is determined to be the communication speed of the first device 110. Step 570 may be performed by the communication speed determiner 286.

In step 570, the first device 110 may transmit various signals to the second device 120 at a speed of, for example, 100 Mbps to the second device 120 before finally determining the communication speed of the first device 110.

Each of the first and second maximum supported communication speeds may be 100 Mbps, 1 Gbps, or 10 Gbps but embodiments of the present disclosure are not limited thereto.

If it is determined that the operation mode of the first device 110 is confirmed to be the master mode in step 510, the transmission operation mode in step 570 may be changed to a training mode and the first device 110 may transmit an idle mode to the second device 120. However, if the operation mode of the first device 110 is confirmed to be the slave mode in step 510, the transmission operation mode in step 570 may be changed to a slave silent mode and the first device 110 may transmit a zero symbol to the second device 120 as a first slave mode signal.

After step 570, the first device 110 performs an initialization operation at the determined communication speed (step 580). For example, the first device 110 may again perform steps 510 to 550 at the determined communication speed. Particularly, in step 510, the first device 110 may again perform only step 340 or 370 illustrated in FIG. 4 at the determined communication speed.

As described above, the communication method according to an embodiment optimally configures a communication speed between devices having different communication speeds, thereby enabling communication between the devices.

Consequently, the Ethernet communication system and the communication method thereof according to an embodiment may support an auto-negotiation function satisfying in-vehicle Ethernet requirements. That is, the Ethernet communication system and the communication method thereof according to an embodiment automatically select the operation mode of each of a plurality of devices as a master mode or a slave mode and may design the first device without the need to consider compatibility with the second device, thereby improving convenience of development of the first device. Even when the plural devices simultaneously demand the master operation mode so that collision occurs, the operation mode of each device may be automatically selected as the master mode or the slave mode after a predetermined duration. In addition, the Ethernet communication system and the communication method thereof according to an embodiment automatically configure communication speeds of devices having different heterogeneous speeds by optimizing the communication speeds. Therefore, if an in-vehicle Ethernet speed of the first device 110 is fixed to, for example, 100 Mbps, the first device 110 may automatically communicate with the second device 120 having a transmission speed of, for example, more than 1 Gbps, which is a high transmission speed to be developed later and the second device 120 may be automatically compatible with the first device 110. Thus, there is no need to consider compatibility with the first device 100 upon designing the second device 120 and extension of communication with various devices (e.g., a vehicle ECU) is possible regardless of an optional state of a vehicle.

The Ethernet communication system according to embodiments of the present disclosure and the communication method thereof may support an auto-negotiation function satisfying in-vehicle Ethernet requirements so that the operation mode of each of a plurality of devices may be automatically configured and a plurality of devices having heterogeneous speeds may communicate with each other.

While the present disclosure has been particularly shown and described with reference to certain embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A first device of an in-vehicle Ethernet communication system, the first device being any one of a plurality of devices communicating with each other using an Ethernet scheme in the in-vehicle Ethernet communication system, the first device comprising:
    a central processor; and
    a physical layer processor configured to connect the central processor to a second device which is another one of the plurality devices,
    wherein the physical layer processor comprises:
        a counter configured to output a first counting end signal after performing a counting operation during a first predetermined duration in response to receiving a driving power source;
        a signal transmitter configured to transmit a first master demanding signal for demanding that the first device continuously operate in a master mode in relation to the second device in response to receiving at least one of a mode signal and the first counting end signal;
        a signal receiver configured to output a master sensing signal which is transmitted by the second device and indicates whether a second master demanding signal for demanding that the second device continuously operate in the master mode is received; and an operation mode controller configured to determine an operation mode of the first device in response to receiving at least one of the first counting end signal and the master sensing signal and to generate the mode signal indicating the determined operation mode.

2. The first device of the in-vehicle Ethernet communication system of claim 1, wherein the operation mode controller determines the operation mode of the first device in response to receiving the first counting end signal and an initial collision signal, and the signal receiver determines whether the first master demanding signal and the second master demanding signal collide and outputs a result of the determination as the initial collision signal.

3. The first device of the in-vehicle Ethernet communication system of claim 2, wherein the counter is reset in response to receiving the initial collision signal and outputs a second counting end signal after performing the counting operation during a second predetermined duration, the operation mode controller generates the mode signal in response to receiving at least one of the second counting end signal, the master sensing signal, and a recollision signal, and the signal receiver determines whether the first master demanding signal and the second master demanding signal recollide and outputs a result of the determination as the recollision signal.

4. The first device of the in-vehicle Ethernet communication system of claim 3, further comprising a duration determiner configured to determine at least one of the first predetermined duration and the second predetermined duration.

5. The first device of the in-vehicle Ethernet communication system of claim 3, wherein the physical layer processor further comprises:

a master/slave signal generator configured to generate a master signal and a slave signal; and a signal selector configured to selectively output one of the master signal and the slave signal to the operation mode controller in response to receiving the first or second counting end signal.

6. The first device of the in-vehicle Ethernet communication system of claim 5, wherein the signal selector includes a multiplexer configured to output the slave signal or the master signal in response to receiving the first or second counting end signal.

7. The first device of the in-vehicle Ethernet communication system of claim 5, wherein the operation mode controller generates the mode signal so as to have a first level in response to receiving the master signal output from the signal selector and generates the mode signal so as to have a second level in response to receiving the slave signal output from the signal selector.

8. The first device of the in-vehicle Ethernet communication system of claim 7, wherein the signal transmitter transmits the first master demanding signal to the second device in response to receiving the mode signal of the first level and transmits a first slave mode signal indicating that the first device operates in the slave mode to the second device in response to receiving the mode signal of the second level.

9. The first device of the in-vehicle Ethernet communication system of claim 8, wherein the signal transmitter comprises:

a physical coding sublayer (PCS) transmitter configured to convert data received from the central processor into a first transmission symbol in response to receiving the mode signal; and a physical medium attachment (PMA) transmitter configured to convert the first transmission symbol received from the PCS transmitter into an electrical transmission signal.

10. The first device of the in-vehicle Ethernet communication system of claim 9, wherein the electrical transmission signal includes at least one of the first master demanding signal and the first slave mode signal.

11. The first device of the in-vehicle Ethernet communication system of claim 10, wherein the signal receiver includes:

a PMA receiver configured to convert an electrical reception signal received from the second device into a reception symbol; and a PCS receiver configured to decode the reception symbol and output the decoded symbol to the central processor, and the electrical reception signal includes at least one of a second slave mode signal indicating that the second device operates in the slave mode and the second master demanding signal.

12. The first device of the in-vehicle Ethernet communication system of claim 1, wherein the physical layer processor further comprises:

an information generator configured to transmit a first communication signal including first information about a first maximum supported communication speed of the first device to the second device in response to receiving the mode signal;

an information receiver configured to receive a second communication signal including second information about a second maximum supported communication speed of the second device; and a communication speed determiner configured to determine a smaller speed between the first and second maximum supported communication speeds to be a communication speed of the first device, and the physical layer processor performs an initialization operation in response to receiving the determined communication speed.

13. The first device of the in-vehicle Ethernet communication system of claim 12, wherein the signal transmitter transmits, to the second device, a first state check signal for determining a first signal transmission state to the second device from the first device in response to receiving the mode signal, the first state check signal corresponds to the first communication signal including the first information, and a second state check signal for determining a second signal transmission state to the first device from the second device corresponds to the second communication signal including the second information.

14. The first device of the in-vehicle Ethernet communication system of claim 13, wherein the information generator comprises an information adder configured to add the first information to the first state check signal.

15. The first device of the in-vehicle Ethernet communication system of claim 14, wherein the information adder includes a scrambler for scrambling the first information and the first state check signal and outputs the scrambled first information and first state check signal as the first state check signal to which the first information is added.

16. The first device of the in-vehicle Ethernet communication system of claim 15, wherein the scrambler comprises:
- a random number generator configured to generate a random number;
- a data selector configured to select scrambling data from the random number; and
- a scrambling unit configured to scramble the first state check signal and the first information, and
- the signal transmitter transmits the scrambled first state check signal and first information to the second device.

17. The first device of the in-vehicle Ethernet communication system of claim 16, wherein the information receiver extracts the second information from a signal generated by scrambling the second information and the second state check signal in the second device and transmitted from the second device.

* * * * *